Fig. 8.
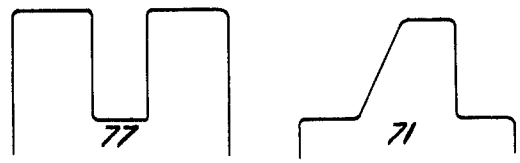
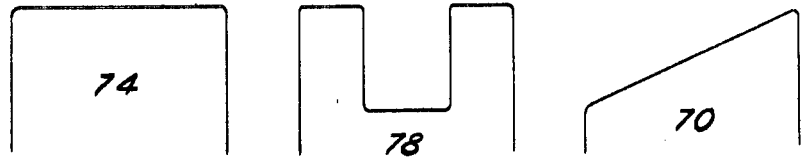
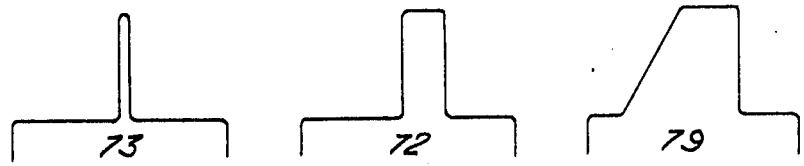
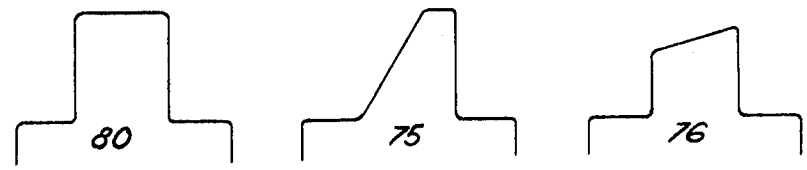

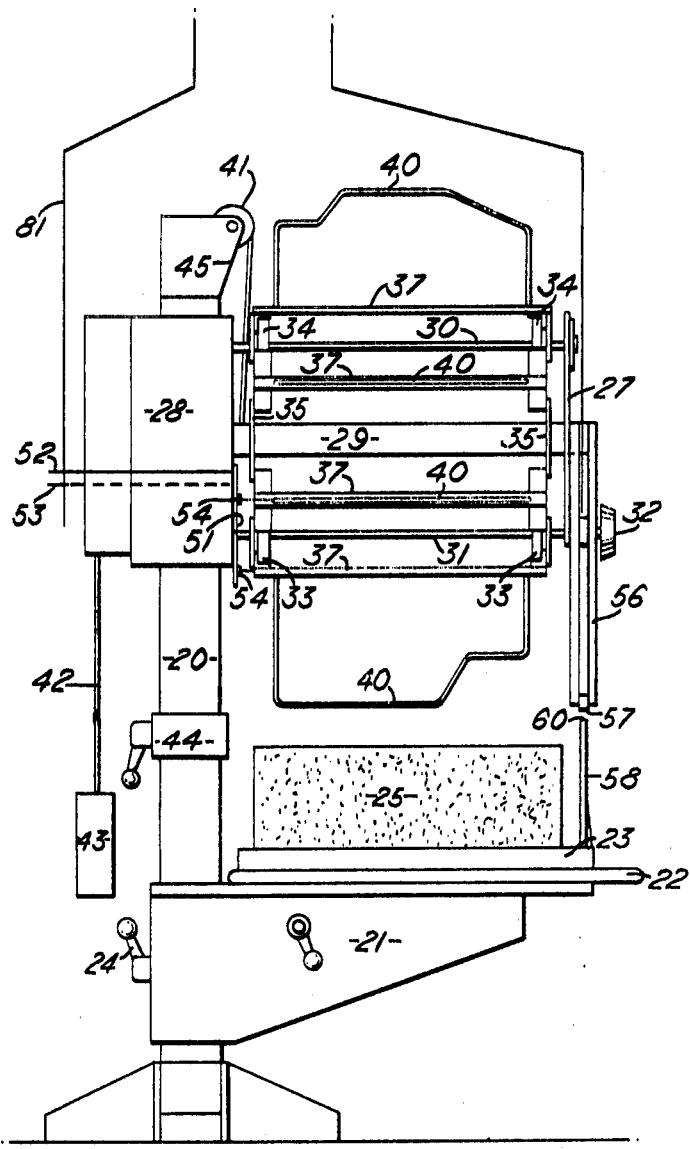

United States Patent Office 3,610,078
Patented Oct. 5, 1971

3,610,078
SHAPING BLOCKS OF NONMETALLIC
MATERIAL
Arwyn Rowlands, Filton, Bristol, England, assignor to
Rolls-Royce Limited, Derby, England
Continuation of application Ser. No. 680,908, Nov. 6,
1967. This application Sept. 4, 1969, Ser. No. 855,120
Claims priority, application Great Britain, Nov. 11, 1966,
50,733/66
Int. Cl. B26f 3/12
U.S. Cl. 83—1
6 Claims

ABSTRACT OF THE DISCLOSURE

An apparatus adapted to form complex three dimensional recess within a block of meltable material through use of a heated bent wire type shaping tool.

This is a continuation of application Ser. No. 680,908, filed Nov. 6, 1967, and now abandoned.

This invention relates to a method for shaping blocks of fusible material by carving out portions thereof and to apparatus for carrying out the method. An example of such material is foamed polystyrene.

The invention is applicable to other fusible materials which have a sufficiently low melting point and noninflammable property to permit a heated tool to carve out portions of the material by localized melting thereof, without the risk of fire. An example is foam rubber.

To enhance the protection of components in transit by means of packaging, the container for a component may be provided with an internal shape which is preformed in a mould to match the profile of the component. However, the production of a mould is expensive, especially if it is a complicated shape, and where the required quantities of moulded shapes are relatively small the cost of the mould may be unacceptable.

The present invention provides a method and apparatus of producing limited quantities of preformed shapes in certain non-metallic materials which is cheap compared with the cost of producing a metal mould. The invention may be used to provide external or internal shapes for use as samples or prototypes.

According to one aspect of the invention a method of shaping a block of fusible material comprises causing a heated metal shaping tool of elongate and bent form to perform a traversing operation through the block, the tool being heated sufficiently to cause localized melting of the block material. In this manner a portion of the block is carved out by localized melting of the block material.

The term "traversing operation" is intended to include linear and/or rotary relative movement between the tool and the block.

The tool may be heated by passing an electric current through it and it may be bent to the shape of the section of the portion which is to be removed from the block.

According to another aspect of the invention, apparatus for carrying out the above method comprises:

(a) a base for supporting the block to be shaped;
(b) a metal shaping tool of elongate and bent form;
(c) a holder for the tool mounted above the base;
(d) means for heating the tool in the tool holder; and
(e) means for causing relative movement between the tool holder and the base in the horizontal or vertical plane or both planes.

Preferably the apparatus additionally comprises:

(a) first and second means which cooperate together to control the passage of the tool through the block,
(b) the first means arranged to move vertically relatively to the second means with relative vertical movement between the tool holder and the base,
(c) and the second means being arranged to move horizontally relatively to the first means with relative horizontal movement between the tool holder and the base.

The control means may comprise a removable member mounted on the base and providing a track along which can ride a cooperating member connected to the tool holder. The track may be a profiled edge of, or a cam slot in, a control member such as a board located on the base and alongside the block.

Preferably the base and the second means are movable horizontally relatively to a bed. Alternatively they may be fixed, and the tool and first means arranged to move horizontally as well as vertically. In this alternative an advantage gained is that an operator can be provided with improved "feel" of the operation to improve control over the apparatus.

By way of example the invention will be described with reference to the accompanying drawings of which:

FIG. 6 is a diagrammatic end view of one form of apparatus for carrying out the invention;

FIG. 8 shows eleven shaping tools in the form of bent wires.

Figure 1:
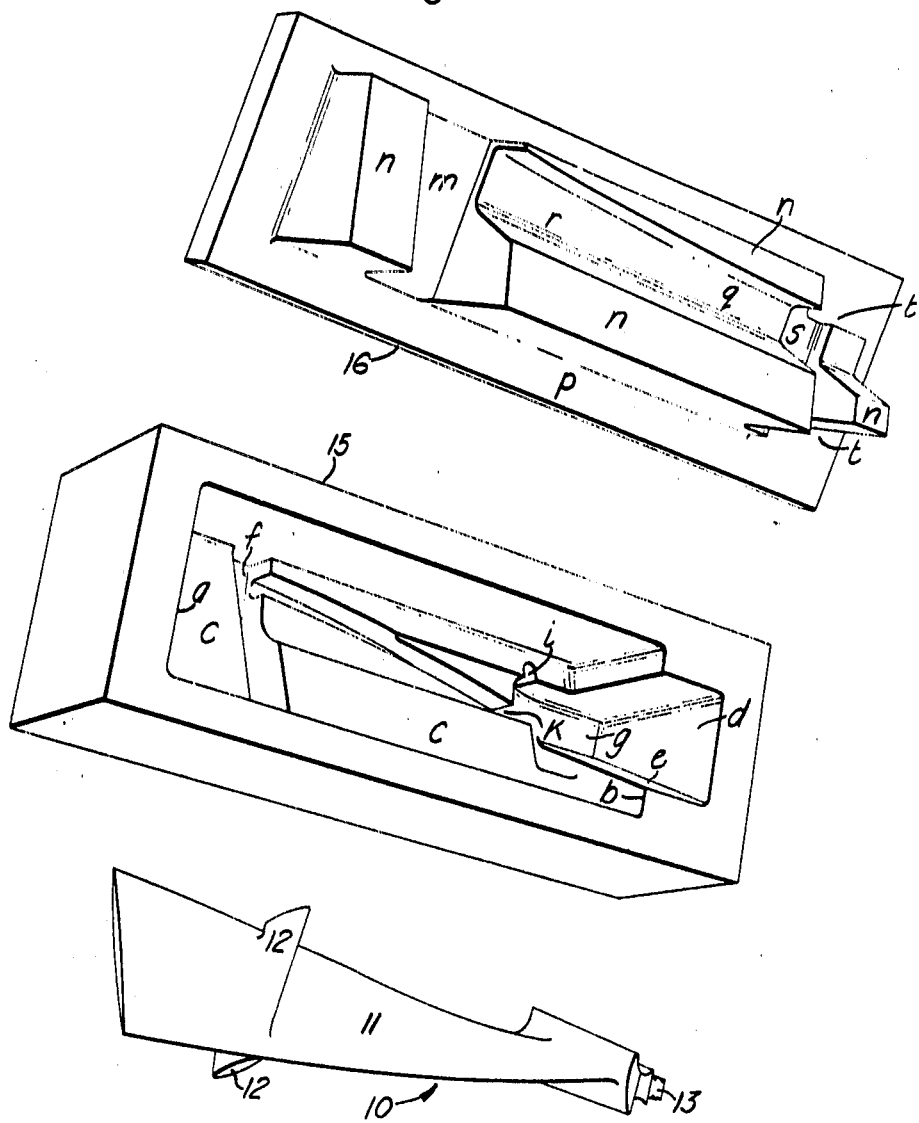
FIG. 1 is a perspective view of an axial flow compressor blade and also a transit container for the blade which is made in two parts having cooperating male and female shaped portions produced by the present invention.
Figure 2:
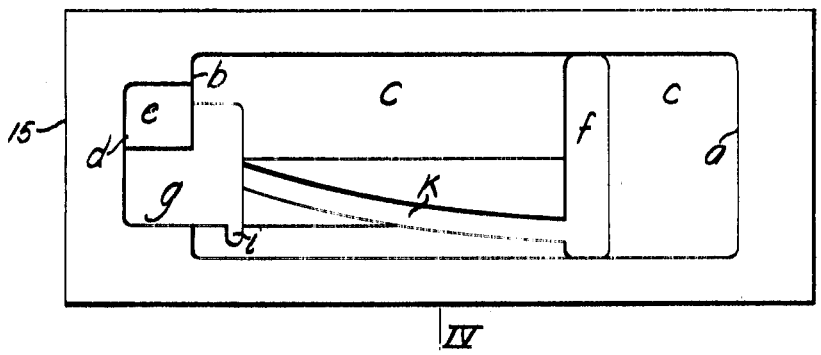
FIG. 2 and FIG. 3 are plan views of the shapes of the container parts of FIG. 1.
Figure 3:
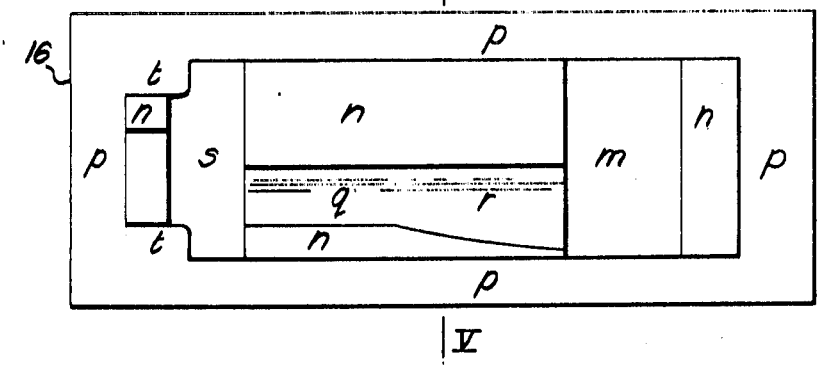
Figure 4:
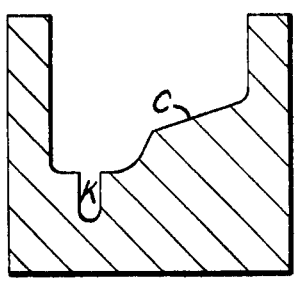
FIGS. 4 and 5 are cross-sections taken through planes IV—IV and V—V of FIGS. 2 and 3.
Figure 5:
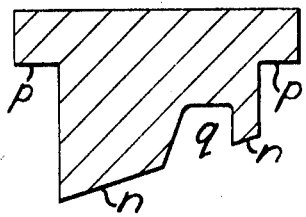

Referring to FIG. 1, it is intended to provide a transit container for the compressor blade 10 of a gas turbine engine. The blade comprises a thin twisted aerofoil portion 11, a snubber 12 projecting from opposing faces of the blade, and a fir-tree root portion 13. To protect the blade from possible damage during storage and transit it is necessary to enclose it snugly in a suitable container. The blade has a complex shape and the interior of the container must be fashioned accordingly.

Referring also to FIGS. 2 to 5, the container is made in two parts, viz. a box part 15 and a lid part 16 which includes a projecting shaped portion designed to enter the box part. For packaging, the blade 10 is placed in position in the box part 15 and then the lid part 16 is put on the box so that the blade is located between the respective shaped portions of the container parts.

The container is of foamed polystyrene which is of light weight and has good energy damping characteristics. In particular it has a low melting point of about 80° C. and can be easily melted by contact with or close proximity to a heated wire tool.

Figure 6A:
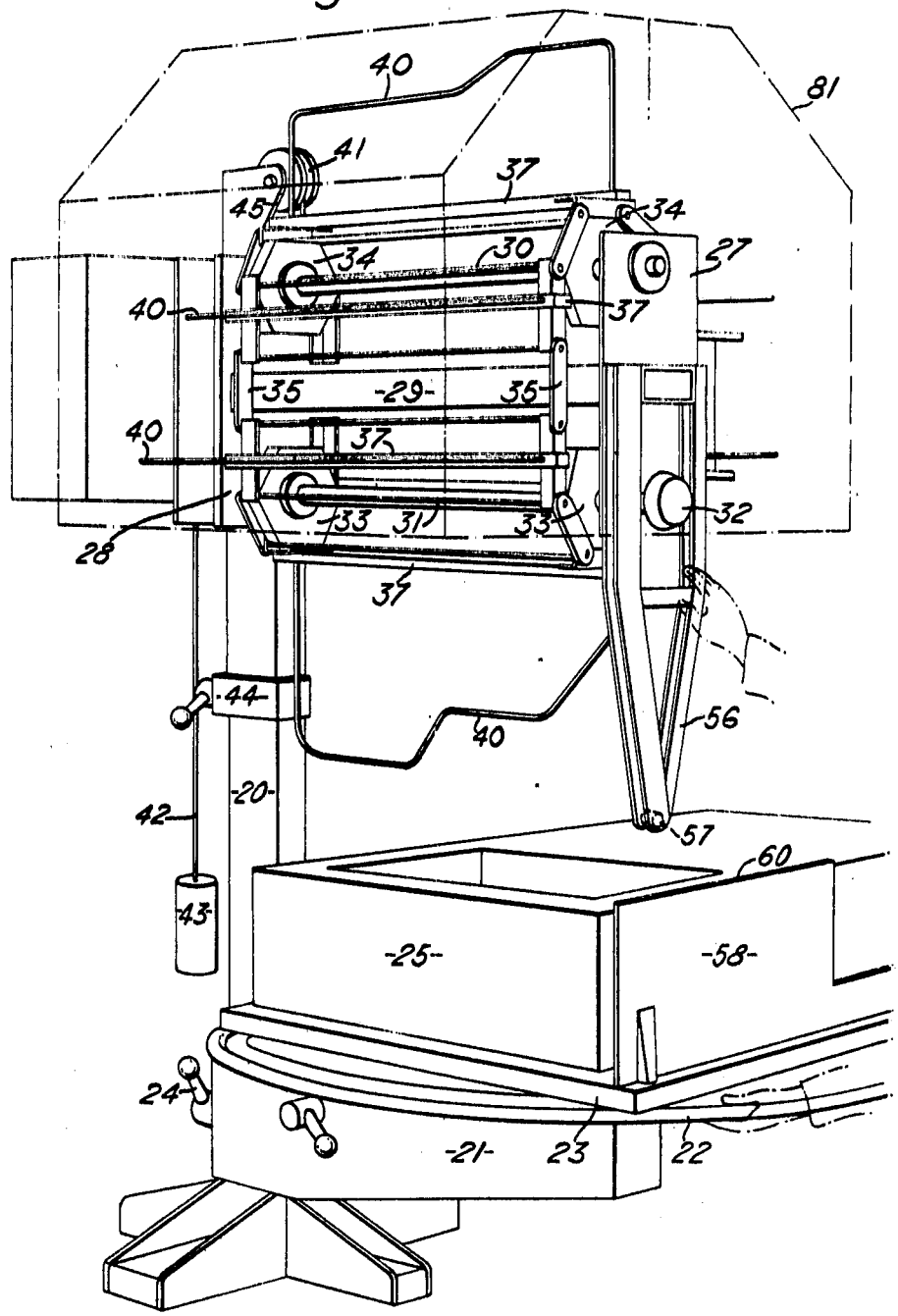
FIG. 6A is a perspective view of the apparatus as seen generally from the right-hand side of FIG. 6. This view also shows the position of an operator controlling the apparatus.

FIGS. 6 and 6A show a vertical pillar 20 which supports a bed 21 for a movable base comprising a slidable work table 22 on which in turn may be supported a rotatable work table 23. The bed which is adjustable in height is locked in position on the pillar by means of a clamp 24. The lower work table 22 is slidable along the bed either manually or by known mechanism. The upper work table 23 is mounted on a central bearing which permits it to rotate relatively to the work table beneath. An oblong block of foamed polystyrene 25 which is to be hollowed out to a particular internal shape is held in position on the upper work table between locating strips. A frame comprising a vertical side plate 27 connected to a sleeve bearing 28 mounted around the pillar 20 by a horizontal cross-member 29 supports upper and lower horizontal shafts 30, 31. The lower shaft which is rotated by a handwheel 32 mounts a pair of sprocket wheels 33 whilst the upper shaft mounts a pair of jockey wheels 34. A flexible means such as a pair of endless chains 35 which are engaged by the wheels 33, 34 supports a series of circumferentially-spaced horizontal carrier arms 37 each of which is arranged to carry a shaping tool in the form of a rigid steel wire 40 in such a manner that the tools are mounted rigidly on the arms and are adapted to shift in a closed loop having a lowermost station for a selected one of the tools in succession. The tools are bent to predetermined shapes to enable them to carry out their respective carving operations. In this regard, as will be seen in FIG. 6A, each tool when at its lowermost station has the form of two upwardly extending terminations which are secured to a respective carrier 37 and an intermediate contoured portion lying in a vertical plane. The top of the pillar 20 carries a pulley 41 over which runs a wire 42, one end of which is secured to the cross-member 29 of the frame whilst a balancing weight 43 hangs from the other end. An adjustable stop 44 on the pillar limits the downward travel of the sleeve bearing 28 and therefore the downward movement of the tool assembly whilst the upward travel of the sleeve bearing 28 is limited by the inclined surface 45 of the pulley mounting. By rotating the handwheel 32 the desired tool 40 is indexed into the operational position immediately above the block and the chains 35 are then locked against rotation. The weight 43 is chosen to give a slight upward bias to the tool assembly but a light downward pressure on the handwheel 32 will cause the tool assembly to descend.

It is desired to heat not only the tool which is to be used but also the next succeeding tool and this may be done electrically in the following manner. An insulator support carrying a pair of concentric arcuate metal strips 51 is located on the sleeve bearing adjacent the arms 37 and the metal strips are connected by leads 52, 53 respectively to a suitable source of electrical current. The arms 37 are of insulating material but the ends of each wire tool 40 are connected to separate carbon brushes 54 which extend horizontally and contact one or other of the conductor strips 51 when a tool is in the operational position, or in the position immediately above it. In this way both tools are automatically connected during indexing of the tool assembly to the source of current so as to be electrically heated before entering the block 25.

It is evident from FIGS. 6 and 6A that the apparatus is adapted to carry a plurality of tools in series for movement along a closed oval-shaped loop the long axis of which extends generally perpendicular to the plane of base 21. In fact, as is clear from these figures, the carrier assembly can carry, for example, four different tools in a manner whereby the one in use will be in a vertical plane while the two next adjacent thereto will extend in a horizontal plane parallel to base 21.

Figure 7:
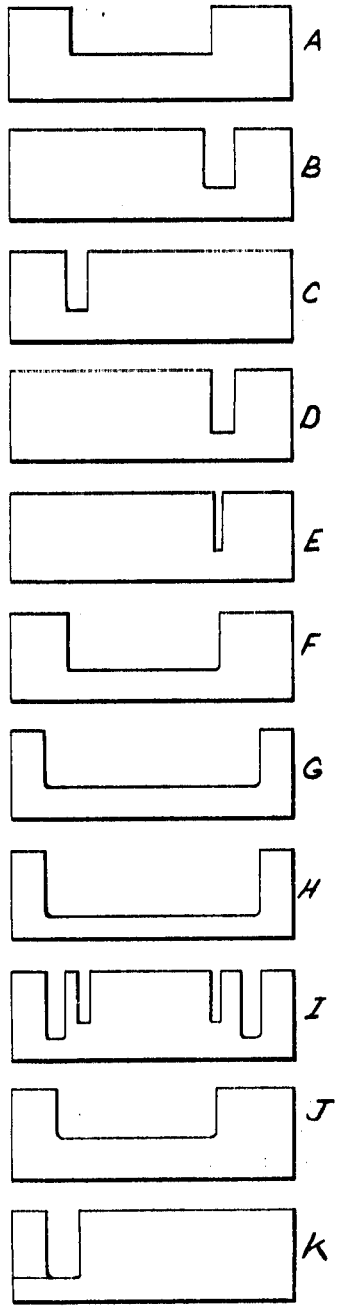
FIG. 7 shows side views of eleven different control boards used with the apparatus of FIG. 6.

Particularly, if the machine is to be operated by unskilled labor, it is necessary to provide for control of the tools 40 so that the correct shape may be carved out of the block 25. To this end, the horizontal cross-member 29 is arranged to support rigidly a downward-extending holder 56 for a cam follower in the form of a roller 57. A cam device in the form of a selected control board or template 58 is placed on the work table 23 and held in position by any suitable holder device. The board presents an upward facing edge 60 of predetermined profile against which the roller 57 is held by the operator. As the work table support 22 is moved along the bed 21 carrying the block and the board with it, the roller 57 is made to move up and down to follow the profile of the edge 60. In this manner the cooperating roller and board control the depth of the heated tool 40 in the block 25 and thus the shape of the portion which is to be carved out of the travelling block. A complex shape such as the blade 10 requires a number of carving operations each performed in sequence by different shaped tools 40 under the control of different template boards 58, as will be explained later with reference also to FIGS. 7 and 8.

In operation, a block 25 of suitable dimensions is located correctly on the work table 23. The appropriate wire tools 40 are plugged into the arms 37 in their order or use, and the first control board 58 is placed in position. The current is switched on to heat the first tool 40 and the next succeeding tool. The operator then grasps the handwheel 32 and pulls down the counter-balanced tool assembly until the roller 57 engages the appropriate end of the board edge 60. This causes the first heated tool 40 to enter the block to the correct depth. The work table support 22 is then traversed along the bed whilst at the same time the operator maintains the roller against the board edge 60. Whenever the roller 57 meets the bottom of a vertical portion of the board edge, which indicates that the heated tool should be raised, the movement of the work table 22 is stopped until the roller has reached the top of the vertical portion, whereupon the traversing operation is continued or the tool is raised clear of the block, according to the circumstances. When the board has served its purpose it may be replaced by the next board, and so on. Similiarly, when a tool is no longer required, the tool assembly may be rotated to present the next tool which has already been heated to save time. Thus, each toool is sunk into the block, caused to perform a traversing operation by relative movement of the block and tool, and then withdrawn from the block.

It is sometimes necessary to produce an arcuate traversing operation of the tool. This may be achieved by turning the work table 23 manually, or alternatively its rotation may be automatically controlled. In the latter case the work table 23 supports a pair of lateral horns mounting cam followers such as rollers at their ends. The rollers are spaced apart in the direction of travel of the work table 22, and when an arcuate traverse is required a cam plate with converging edges is located alongside the horns. As the work table 22 slides past the cam plate, each roller travels along one or other of the convergent edges so that the work table 23 carrying the block 25 is automatically given a controlled partial rotation about its central bearing.

The box part 15 may be shaped internally by the following operations listed in sequence:

| Cavity | Control board | Shaping tool | Tool traverse |
|---|---|---|---|
| From wall a to wall b with an inclined base c. | A | 70 | Straight. |
| d with an inclined wall e. | B | 71 | Do. |
| f | C | 72 | Straight but work table 23 is initially turned through 90° so that block lies transversely to sliding movements. |
| g | D | 72 | Do. |
| j | E | 73 | Do. |
| k | F | 73 | Arcuate using a cam plate. Work table 23 is initially turned back so that block is once more parallel to the sliding movement. |

The lid part 16 may be provided with its projecting shaped portion by means of the following operations listed in sequence:

| Cavity | Control board | Shaping tool | Tool traverse |
|---|---|---|---|
| m and inclined surface n. | B | 70 | Straight. |
| p | H | 74 | Straight, four times. Two of them with the work table initially turned through 90° so that block lies transversely to sliding movement. |
| q | I | 75 | Straight. |
| r | I | 76 | Arucate using a cam plate. |
| s | I | 72 | Straight but work table 23 is initially turned through 90° so that block lies transversely to sliding movement. |
|  | K | 74 | Straight, twice. |

Board J and tools 77 to 80 are examples of further components which could be used.

In a typical example relating to foamed polystyrene, the tool wire was of 10 standard wire gauge and the electrical source supplied 28 amperes at 110 volts. With a wire temperature of 190° C. a suitable rate of penetration was one inch per ten seconds.

The herein disclosed apparatus and method is equally applicable to less complicated operations. For example a simple conical cavity in a box is produced by sinking a heated tool in the form of the appropriate conical profile into a block of foamed polystyrene or the like, and then slowly rotating the work table 23 through 180°.

When objectionable fumes are given off, the apparatus is provided with an extractor hood 81 for sucking away the fumes.

What is claimed is:
1. Apparatus for shaping a block of material which is locally meltable along a line of contact with a heated shaping tool of the bent wire type, the apparatus comprising:
   (a) a base for supporting the block to be shaped,
   (b) a tool-supporting frame,
   (c) means for moving the frame and base relatively to one another both in a first direction towards and away from one another, and in at least one direction transverse to said first direction,
   (d) a plurality of carriers on said frame, interconnected in a series and each one adapted to hold a respective shaping tool,
   (e) means for selectively shifting the series of carriers relatively to the frame, to present any selected one towards the base whereby a selected tool could make shaping engagement with the block upon relative movements of the frame and base in said first and said other directions, while all the remaining carriers are held in positions relative to the frame such that tools carried thereby remain clear of the block throughout said relative movements,
   (f) holder means on the base for removably supporting a template,
   (g) follower means in fixed position on the tool-supporting frame, adapted to engage the contoured edge of a template in said holder means and thereby determine the relationship of said movements in said first direction and said other direction,
   (h) and means for heating a tool held by said selected carrier.
2. Apparatus as claimed in claim 1, including
   (i) means for pre-heating a tool which is carried by a said carrier adjacent in the series to said selected carrier.
3. Apparatus as claimed in claim 1 for shaping a recess in an upper surface of a block of said material, wherein:
   (j) said frame and series of carriers lie above said base,
   (k) said series of carriers is adapted to shift in a closed loop having a lowermost station for said selected one of the tools,
   (l) a plurality of bent wire type shaping tools of shapes all different from one another, each mounted in a respective one of the carriers,
   (m) and each of said tools when in said lowermost station has the form of two upwardly-extending terminations secured to the respective carrier, and an intermediate contoured portion lying in a vertical plane.
4. Apparatus as claimed in claim 1, for shaping a complex recess in a block of said material, wherein:
   (n) said series comprises more than four carriers, interconnected into a closed loop by flexible means,
   (o) and means on the frame for guiding the carriers around an oval path having its length directed away from the base.
5. Apparatus as claimed in claim 4, wherein
   (p) the flexible means spaces the carriers apart along the oval path, whereby tools which may be carried by carriers adjacent in the series to said selected carrier are disposed in a plane parallel to the base.
6. Apparatus as claimed in claim 3, inclduing
   (q) a plurality of templates having contoured edges different from one another and adapted to be used one at a time in said holder means.

References Cited
UNITED STATES PATENTS
| | | | |
|---|---|---|---|
| 3,117,211 | 1/1964 | Tansey | 83—171 |
| 3,199,388 | 8/1965 | Redfield | 83—171 X |
| 3,540,336 | 11/1970 | Kelsey | 83—171 |

FOREIGN PATENTS
| | | | |
|---|---|---|---|
| 805,836 | 12/1958 | Great Britain | 83—171 |

FRANK T. YOST, Primary Examiner

U.S. Cl. X.R.

83—16, 171, 413, 552, 565